(12) United States Patent
Wilk

(10) Patent No.: US 6,973,439 B1
(45) Date of Patent: Dec. 6, 2005

(54) COMPUTER NETWORK MEDIATED FINANCING METHOD

(76) Inventor: Peter J. Wilk, 185 W. End Ave., New York, NY (US) 10023

( * ) Notice: Subject to any disclaimer, the term of this patent is extended or adjusted under 35 U.S.C. 154(b) by 0 days.

(21) Appl. No.: 09/329,668

(22) Filed: Jun. 10, 1999

(51) Int. Cl.[7] ............................................. G06F 17/30
(52) U.S. Cl. .............................. 705/35; 705/37; 705/38
(58) Field of Search .............................. 705/35, 37, 38

(56) References Cited

U.S. PATENT DOCUMENTS

| | | | |
|---|---|---|---|
| 5,999,907 A * | 12/1999 | Donner | 707/511 |
| 6,018,714 A * | 1/2000 | Risen et al. | 705/1 |
| 6,026,383 A * | 2/2000 | Ausubel | 705/4 |
| 6,289,462 B1 * | 9/2001 | McNabb et al. | 713/201 |

FOREIGN PATENT DOCUMENTS

| WO | WO 99/05625 | * | 2/1999 | ............ G06F 17/60 |
|---|---|---|---|---|

OTHER PUBLICATIONS

Rice, Denis T.; The Internet and the Cybersecurities Marketplace, Jul. 1998.*

Lovenheim, David A.; Before you knock on their door, know the venture game, Business Journal Serving Southern Ti r, CNY, Apr. 13, 1998, vol. 12 issue 8, p. 12 2p.*

RCT's Tips for Investors, printed from http://web.archive.org/web/19980121180504/www.rctech.com/tips, 1998.*

Reed, Breet "Valuation of Intellectual Property for Licensing or safe: What's It Worth?", Oral Presentation at the American Conference Institur , pp. 1-42 (May 1995).*

Rajkowski, E. Mark; Financing alternatives: What flavor is right for you?, Business Journal Serving Southern Tier, CNY, Mohaw Valley, Finger Lakes, North, May 11, 1998, vol. 12 Issue 10, p1T, 2p.*

Leibovich, Mark; Journey Into the Secret Heart of Capitalism; The Washington Post, Aug. 9, 1998.*

Revolution or Evolution; The IPO Reporter, v23 n 7 p 4, Feb. 1999.*

Venture Management Firm Launches On-line Forum, New Hampshire Business Review, Sep. 25, 1995, vol. 17 Iss 20.*

"How to Conact RCT", a web archive of www.rctech.com dated Jan. 21, 1998 printed from http://web.archieve.org.*

* cited by examiner

*Primary Examiner*—Jagdish Patel
(74) *Attorney, Agent, or Firm*—R. Neil Sudol; Henry D. Coleman; William J. Sapone

(57) ABSTRACT

In a method for facilitating financing of new technology, a host computer is connected to a global computer network for receiving, over the network from remote computers, information describing purported advances in technology. The host computer is accessed, for example, by a user, to obtain the information downloaded from the global computer network. An evaluation of the advances in technology so obtained is then performed to determine, for each of the advances, a fixed monetary amount to be contributed in exchange for a unit of equity in a prospective technology development venture to develop the respective advance. Identifications of the advances together with respective values of the determined fixed monetary amounts are transmitted over the global computer network to preselected computers.

12 Claims, 3 Drawing Sheets

COMPUTER NETWORK MEDIATED FINANCING METHOD

BACKGROUND OF THE DISCLOSURE

This invention relates to a business method. More specifically, the present invention relates to a financing method. The financing method is especially useful for the financing of new business ventures for the development of new technology. It is contemplated that the method of this invention will be executed primarily, if not exclusively, over a global computer network such as the Internet.

As a whole, inventors have long been accustomed to nearly insurmountable hurdles in developing their inventions. Conceiving of an improvement in technology and even procuring a patent on that improvement have long been easier to accomplish than actually realizing the invention in a marketable product. The principal stumbling block to bringing a new invention to market is financing. Inventors have difficulty finding investors interested in financially supporting the inventions. Potential investors have a similar difficulty in finding, identifying and evaluating new technological advances. Frequently, although an investor might become acquainted with a new invention, the investor's education, experience and knowledge is not appropriate for enabling the investor to evaluate the invention.

OBJECTS OF THE INVENTION

An object of the present invention is to provide a method for facilitating technology development.

It is a further object of the present invention to provide such a method which facilitates the association of potential investors with technological advances of merit.

An additional object of the present invention is to provide such a method which provides an evaluation of selected technological advances to potential investors.

Another object of the present invention is to provide such a method which is increases the rate at which potential investors are associated with promising technological advances.

A more particular object of the present invention is to provide such a method which utilizes a global communications network, especially a global computer network.

These and other objects of the invention will be apparent from the drawings and descriptions herein.

SUMMARY OF THE INVENTION

In a method in accordance with the present invention for facilitating financing of new technology, a host computer is connected to a global computer network for receiving, over the network from remote computers, information describing purported advances in technology. The host computer is accessed, for example, by a user, to obtain the information downloaded from the global computer network. An evaluation of the advances in technology so obtained is then performed to determine, for each of the advances, a fixed monetary amount to be contributed in exchange for a unit of equity in a prospective technology development venture to develop the respective advance. Identifications of the advances together with respective values of the determined fixed monetary amounts are transmitted over the global corrupter network to preselected computers.

It is contemplated, therefore, that inventors from all over the world will transmit to the host computer sufficient information to identify their inventions for purposes of evaluation. The information may take the form of patents or other descriptions and drawings. In some cases, ancillary communications devices such as telecopiers and communications links such as satellites may be used by the inventors to transmit information pertaining to their inventions to a central location, for example, an office where the host computer is disposed.

The inventions are evaluated by a handful of experienced specialists including, for instance, a patent attorney, an engineer, a marketing expert, and a financial analyst. The inventions are evaluated to determine, inter alia, the market size, the existence of potential competitors, the ease of development, the existence and strength of patent protection, development costs, ultimate manufacturing costs and profit margins. Upon ascertaining that a particular invention represents a valuable technological advance, the evaluation committee determines an initial stock valuation. In particular, the fixed monetary amount is set for obtaining a unit of ownership in the prospective technology development venture to develop the respective advance. For instance, the fixed monetary amount may be for a 1% stake in the prospective technology development venture.

The identifications of the selected inventions, transmitted to the computers of the potential investors include enough information for the individual investors to make their own determination as to the desirability of financially participating in the development of the inventions. That information generally includes a brief description of each invention, and possibly a substantially truncated business plan. The truncated business plan sets forth the conclusions reached by the evaluation committee with respect to market size, potential competitors, development strategy, patent protection, development costs, ultimate manufacturing costs and profit margins.

Generally, it is contemplated that the prospective or potential investors are preselected and limited in number. Each potential investor may pay a yearly fee for the privilege of obtaining the technology identifications and recommendations from the evaluation committee. If a potential investor does not submit any bids over a pre-established interval, for instance, a year, that investor might be barred from future participation, in order to provide another potential investor with the opportunity of participating.

A method in accordance with the present invention enhances technology development on a global scale. Inventors from all over the world are provided with an opportunity of becoming associated or connected with international investors. Conversely, investors are provided with access to worldwide inventive activity.

It is contemplated that the present invention will facilitate technology development in part by having a known source, i.e., the evaluation committee, provide invention evaluations to investors. The investors need not appraise the capabilities of the evaluation committee in each instance to determine the reliability of the committee and its pronouncements. In addition, delay in the investment process will be reduced by omitting conventional negotiation processes. The investors do not negotiate the amount of money they are contributing or the percentage that they obtain in return for their investment. Instead, the investment opportunity is presented as a "take it or leave it" proposition. Similarly, the inventors are each presented with one of a few pre-established compensation schemes. There is in general no negotiation; the inventors either accept the terms or there is no deal to develop the inventors' ideas. The compensation to the inventor is selected by the evaluation committee. The normal negotiation process can be omitted simply because of the numbers of inventors and investors involved. These numbers are possible in large part because of the contemplated utilization of the Internet as a medium for obtaining information from inventors pertaining to technological advances and for transmitting bid prices and bid numbers to and from investors.

In accordance with another feature of the present invention, it is the host computer which is operated to receive, over the global network from at least some of the preselected (investor) computers, respective bids for desired numbers of units of equity in the technology development ventures. Alternatively, it possible to have different computers interface with the inventors on the one hand and the investors on the other hand.

In accordance with a further feature of the present invention, the method further comprises setting a maximum number of units of equity on which bids may be made for each of the advances, operating a computer (e.g., the host computer) to automatically tally totals of units of equity bid for each of the advances, and, for each of the advances, operating that computer to transmit a bidding termination signal to each of the preselected computers upon the attainment of the respective maximum number of units of equity.

Thus, the evaluation committee sets a total number of units of equity which are made available to the group of investors. For example, 20 percentage units might be put up for "sale" for a total equity stake of 20% to the investors. Or, 80 units of ¼% each might be offered, again for a total equity stake of 20% to the investors. Additional strictures might be placed on the sale of the ownership units. For example, the individual investors might be limited to respective stakes of 5%.

The host computer or other central computer interfacing with the pool of potential investors may be operated to automatically advise the preselected investor computers over the global computer network as to the respective numbers of units of equity subscribed to by each of the preselected computers. Thus, the investors are made aware of the bidding or sale process in real time. Their own evaluations may be made with a knowledge of how the investment bidding is proceeding in general. Alternatively, in many cases it may be conducive to the investment process to maintain the bidding in secrecy.

The host computer or other central computer interfacing with the pool of potential investors may be operated to automatically record, for each of the technological advances, identities of the preselected computers which submitted bids for units of equity in the technology development venture associated with the respective advance. That computer is also operated to record, for each of the advances, numbers of units subscribed to by the bidding ones of the preselected computers. Thus, the entire investment process may be automatically controlled via the host or central computer, from the transmission of the identification and equity prices to the recording of the individual investment and the termination of the investment process.

For security purposes, the identifications and the respective equity prices are transmitted in encrypted format.

a business method for enhancing investment in new technologies comprises, pursuant to another conceptualization of the present invention, (a) selecting a predetermined number of potential investors, and (b) transmitting, to the potential investors, investment opportunities each comprising an identification of purportedly new technology and a fixed monetary amount to be exchanged in return for a predetermined unit of equity in a prospective technology development venture to develop the respective technology. This method further comprises (c) receiving bids for units of equity from at least some of the investors, (d) recording identities of the bidding investors and the numbers of units of equity bid, (e) automatically tallying total units bid, and (f) terminating bidding upon attainment of a predetermined number of units bid.

The transmitting of one of the investment opportunities to the potential investors generally includes operating a host or central computer to transmit the respective identification and the respective fixed monetary amount over a global computer network to preselected computers each associated with a respective one of the potential investors.

Preferably, the receiving of the bids for units of equity includes operating the host or central computer to monitor messages arriving over a global computer network. The host computer is also preferably operated to monitor information arriving over the global computer network, where the information describes purported advances in technology. In that case, the method further comprises selecting the prospective technology development venture from among the purported advances in technology described in the information arriving over the global computer network. The automatic tallying of the total units bid preferably includes operating the host computer to add units bid by respective ones of the bidding investors. In that event, the terminating of the bidding includes operating the host computer to transmit a bidding termination signal to the preselected computers associated with the bidding investors.

DESCRIPTION OF THE PREFERRED EMBODIMENTS

Figure 1:
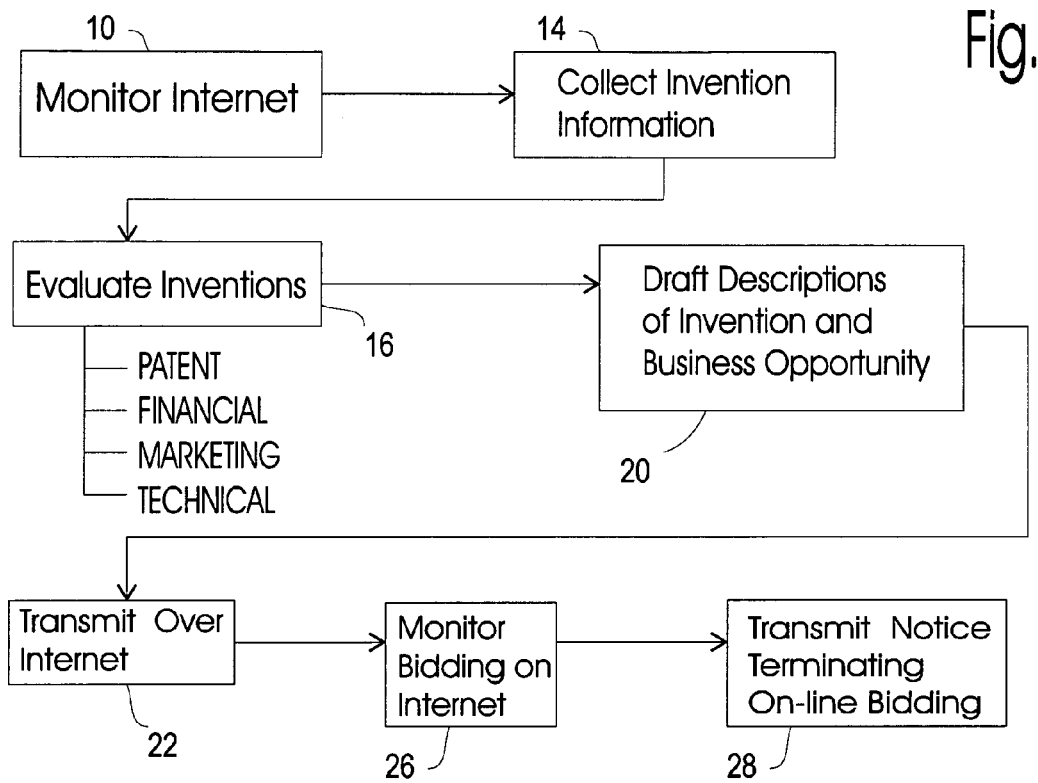
FIG. 1 is a flow chart diagram illustrating steps in a business or financing method in accordance with the present invention.

As illustrated in FIG. 1, a business method particularly directed to the financing of new technology includes an initial step 10 of monitoring a global computer network 12 (FIG. 2), i.e., the Internet, for requests from technology innovators such as inventors. The requests are transmitted over the Internet 12 from computers 11 (FIG. 2) of the inventors or innovators. The requests are collected, collated and organized in a step 14. It is contemplated that the requests received over the Internet 12 include sufficiently detailed descriptions, for example, in the form of patent disclosures, of the technological advances or innovations to enable an evaluation 16 of the technological advances or innovations on a number of different bases. In some cases, ancillary communications devices such as telecopiers (not illustrated) and communications links such as satellites (not illustrated) may be used by the inventors and innovators to transmit information pertaining to their inventions to a central location, for example, an office where a host computer 18 (FIG. 2) is disposed.

Host computer 18 is connected to the Internet 12 in part for purposes of monitoring incoming requests by inventors or technology innovators. Host computer 18 may be a web server or provided with web-browser software for accessing a web server.

Incoming requests to assist in the further development of technology innovations and inventions are evaluated at 16 by a handful of experienced specialists including, for instance, a patent attorney, an engineer, a marketing expert, and a financial analyst. The inventions or purported technology innovations are evaluated to determine relevant parameters such as market size, the existence of potential competitors, the ease of product development, the existence and strength of patent protection, development costs, ultimate manufacturing costs and profit margins. Upon ascertaining that a particular invention or technological advance represents a valuable business opportunity, the evaluation committee sets a fixed monetary amount for obtaining a unit of ownership in a prospective technology development venture to develop the invention or technological advance. The fixed monetary amount may be, for instance, for a ¼% or a 1% stake in the prospective technology development venture.

In a step 20, the evaluation committee produces a description of a respective invention or technological advance, as well as a summary of the business opportunity. This summary includes all the information that an investor would find necessary to ascertain the advisability of investing in the prospective technology development venture to develop the invention or technological advance. The summary may take the form, for example, of a shortened business plan.

In a step 22, the committee's description of the invention or technological advance and the associated business opportunity is transmitted over the Internet 12 to a number of preselected computers 24 (FIG. 2) accessed by respective investors. The investors are preselected as members of an investment pool for advancing technology discovered, evaluated, and recommended by the evaluation committee. The investors pay a membership fee, for example, $1,000 annually to the evaluation committee, in large part for supporting the efforts thereof.

Subsequent to the transmission of business or investment opportunities over the Internet 12 in step 22, the Internet 12 is monitored in a step 26 to detect bids by investors for units of ownership in the prospective technology development venture. The various investors may or may not be made aware of the sale of shares to other investors.

As discussed below with reference to FIG. 3, host computer 18 keeps tracking of the bidding or share buying process in part to determine when a predetermined maximum number of shares or units of participation in the prospective technology development venture have been taken by investors. Upon determining that various investors have subscribed to the predetermined maximum number of shares or units, host computer 18 transmits a notification (step 28) to all of the potential investors to indicate that the particular business opportunity or prospective technology development venture has been fully subscribed and that further bids will not be accepted.

Figure 2:
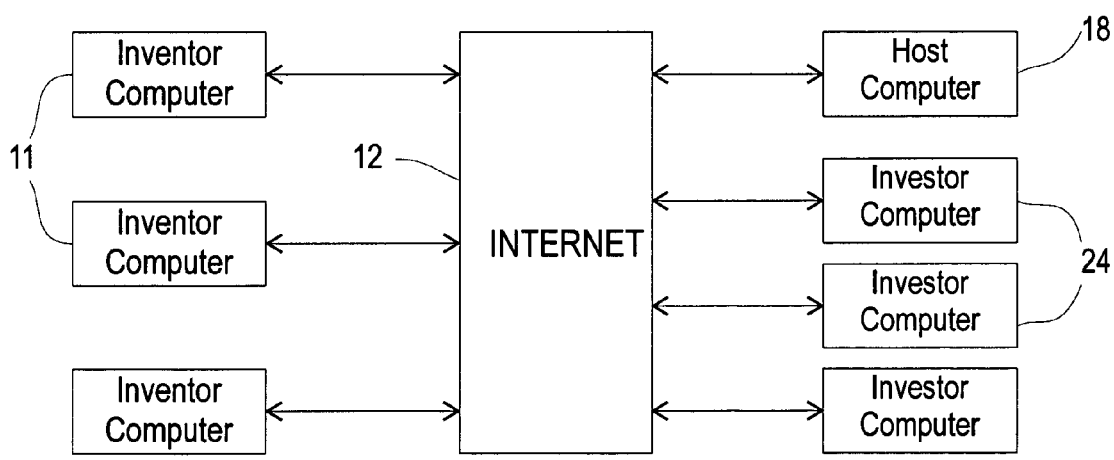
FIG. 2 is a block diagram of a global computer network utilized for carrying out certain steps in the method of FIG. 1.
Figure 3:
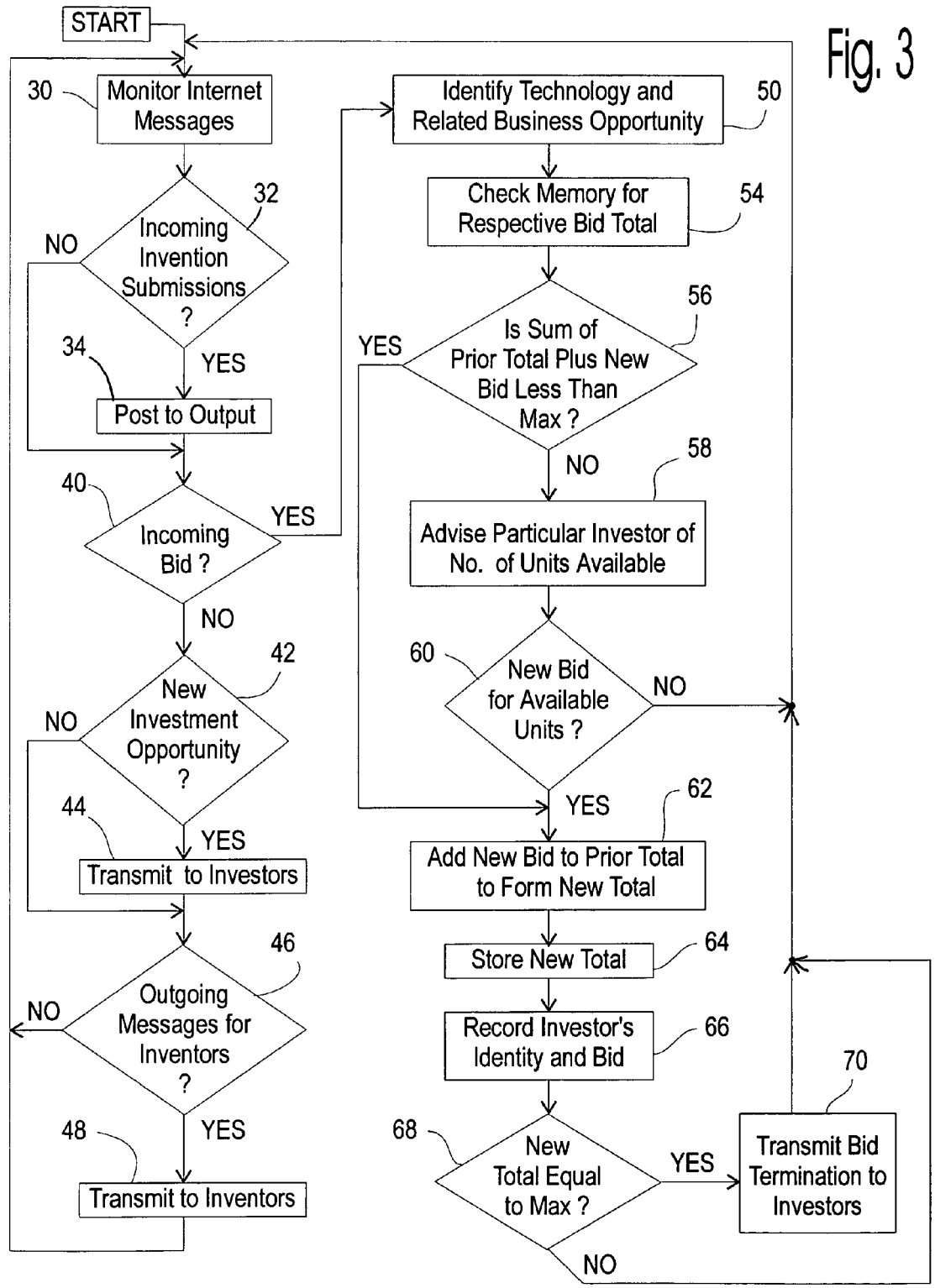
FIG. 3 is a flow chart of operations undertaken by a host computer depicted in FIG. 2.

As depicted in FIG. 3, host computer 18 monitors the Internet 12 in a step 30 for incoming messages and information. Upon detecting an incoming message or information, computer 18 makes an inquiry 32 as to whether there is a request for assistance in developing an invention or technological advance. Such a request is generally transmitted from an inventor's computer 11 (FIG. 2). If there is an incoming request of this nature, computer 18 formats the inquiry in a step 34 and makes the request available to technology evaluation personnel via a display 36 or a printer 38 (see FIG. 4). Computer 18 then inquires at a decision junction 40 as to whether there is an incoming bid from an investor's computer 24. If not, computer 18 inquires at 42 whether there is a request from the technology evaluation personnel to transmit a new investment opportunity to investors' computers 24 (FIG. 2) via the Internet 12. An affirmative outcome to this inquiry results in computer 18 transmitting the new investment opportunity to all of the investors in a step 44. As discussed above, the investment opportunity is characterized by a description of a respective invention or technological advance and various legal, financial, marketing and technological considerations pertaining to the development of the invention through various stages from conception to commercialization.

Computer 18 conducts an investigation or scan 46 to determine whether there are any outgoing messages queued up for one or more inventors or request submitters. The messages are transmitted to respective inventors or innovators in a step 48. Such messages include notifications of acceptance of inventions or innovations for development and associated terms for licensing or assignment of rights from the inventors or innovators to the respective nascent technology development ventures. It is contemplated that these terms for licensing or assignment include some monetary compensation to the respective inventors or innovators and that the terms are essentially non-negotiable. If the inventors or innovators do not accept the offers, then the inventions or technological innovations are not accepted for development.

If computer 18 detects an incoming investor bid at decision junction 40, computer 18 parses the bid information in a step 50 to determine the particular invention or technological advance and the associated investment opportunity which is the subject of the incoming bid. This step 50 is necessary in part because there may be more than one investment opportunity outstanding for bid acquisition. Once the subject of the incoming bid has been ascertained, computer 18 checks an internal memory 52 (FIG. 4) in a step 54 to determine a total number of shares or investment units which have been bought or reserved by investors for the respective technological advance or investment opportunity. If the sum of the prior total plus the number of shares or units requested by the incoming bid exceeds a predetermined maximum number (e.g., 20% of the total shares or units of ownership), as determined by computer 18 at a decision junction 56, then computer 18 transmits a signal to the respective investor computer 24 in a step 58, indicating the number of available shares or investment units. If the particular investor does not transmit a bid requesting the available number of shares or investment units, as determined by computer 18 at a query 60, then computer 18 returns to monitoring the Internet 12 for incoming messages (step 30). If the particular investor does transmit a bid requesting the available number of shares or investment units (or fewer), as determined by computer 18 at query 60, then computer 18 adds the bid number to the prior total in a step 62 to determine a new subscription total, that is, a new total of shares or investment units for which bids or purchase orders have been placed. Step 62 is also executed by computer 18 upon determining at decision junction 56, that the sum of the prior total plus the number of shares or units requested by the incoming bid is less than (or equal to) the predetermined maximum number of shares or investment units made available in the subscription offer.

The new subscription or bid total determined in step 62 is stored by computer 18 in memory 52 (FIG. 4) in a step 64. Computer 18 also stores in memory 52, in a step 66, an identification of the investor who submitted the current bid or subscription request, as well as the number of ownership shares or investment units purchased by that investor. Computer 81 doubles checks in an inquiry 68 whether the new subscription or bid total, determined in step 62, is equal to the predetermined maximum number of ownership shares or investment units available in the subscription offer for the particular technology development venture. If the maximum number of ownership shares or investment units have been subscribed to or purchased, computer 18 transmits a termination notice to all investors in a step 70.

Figure 4:
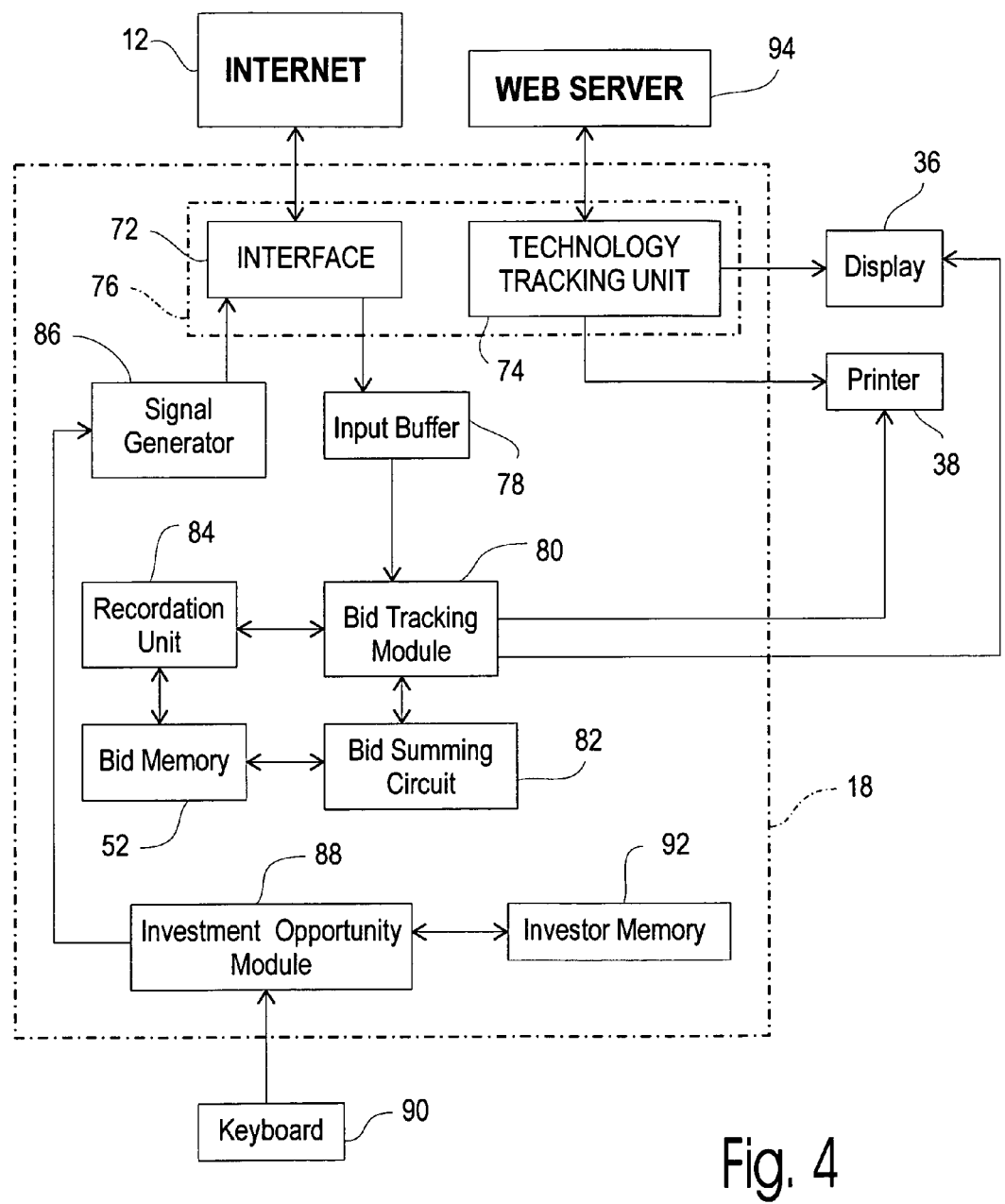
FIG. 4 is a block diagram of functional components of the host computer of FIG. 2, which are realized by generic computer circuits as modified by programming.

As illustrated in FIG. 4, host computer 18 includes a interface 72 connected to the Internet 12 for transmitting and receiving electronic mail messages and for accessing the World Wide Web. Interface 72, as well as a technology tracking unit 74, may be parts of a web browser 76. Interface 72 detects the presence of investor bids or purchase orders and forwards this information to an input buffer 78 for temporary storage. Buffer 78 is connected to a bid tracking module 80 which parses incoming bids to determine investor identities, the relevant investment opportunities, and the numbers of shares or investment units. Bid tracking module 80 is connected to a summing circuit 82 which accesses memory 52 to determine the total numbers of shares or investment units which have been purchased during an on-line investment process as described hereinabove. Bid tracking module 80 is also connected to a recordation unit 84 which updates information stored in memory 52, including bid or subscriptions totals as well as the identities of bidding investors and their respective bid or purchase orders. In addition, bid tracking module 80 is connected to display 36 and printer 38 for informing supervisory personnel, e.g., the evaluation committee of the bid or investment status for any business opportunity currently outstanding for investment.

Interface 72 is also connected at an input to a signal generator 86 which formats, for instance, investment opportunity information from a module 88 and inventor messages as discussed above. Investment opportunity module 88 is connected to an input device such as keyboard 90 and to a memory 92 which stores names and electronic addresses for each of a select group of potential investors.

As further illustrated in FIG. 4, computer 81 and particularly technology tracking unit 74 are connected to a web server 94 which maintains a web site for advising the public as to the financing services discussed hereinabove and to the procedures for accessing those financing services. Technology tracking unit 72 accesses the web server 94 to obtain requests from inventors, etc.

It is to be understood that the various functional components of host computer 18 illustrated in FIG. 4 are realized by generic computer circuits as modified by programming.

Although the invention has been described in terms of particular embodiments and applications, one of ordinary skill in the art, in light of this teaching, can generate additional embodiments and modifications without departing from the spirit of or exceeding the scope of the claimed invention. For example, an investment method in accordance with the invention may be undertaken for businesses other than those founded on patentable inventions. Businesses with new marketing strategies, for example, might be subject to a similar investment process.

It is to be noted that an investment process in accordance with the present invention may be performed without accessing the Internet. However, in view of the large number of investors in the investor pool, as well as the worldwide pool of inventors and other technology innovators, using the Internet is believed to be especially effective in carrying out the process.

Accordingly, it is to be understood that the drawings and descriptions herein are proffered by way of example to facilitate comprehension of the invention and should not be construed to limit the scope thereof.

What is claimed is:

1. A method for facilitating financing of new technology, comprising:
   receiving over a host computer information describing purported advances in technology, from remote computers over a global communication network connected to the host computer;
   accessing said host computer to obtain said information;
   performing an evaluation of said advances in technology;
   determining, based on the evaluation, for each of said advances, a fixed monetary amount to be contributed in exchange for a unit of equity in a prospective technology development venture to develop the respective one of said advances;
   transmitting, over said global computer to preselected computers, identifications of said advances together with respective values of the determined fixed monetary amounts; and
   receiving at the host computer, over the global computer network from at least some of said preselected computers, respective bids for desired number of units of equity in the technology development ventures.

2. The method defined in claim 1, further comprising:
   setting a maximum number of units of equity on which bids may be made for each of said advances;
   operating said host computer to automatically tally totals of units of equity bid for each of said advances; and
   for each of said advances, operating said host computer to transmit a bidding termination signal to each of said preselected computers upon the attainment of the respective maximum number of units of equity.

3. The method defined in claim 2, further comprising operating said host computer to automatically advise said preselected computers, over said global computer network, as to the respective numbers of units of equity subscribed to by each of said preselected computers.

4. The method defined in claim 2, further comprising operating said host computer to automatically record, for each of said advances, identities of the preselected computers which submitted bids for units of equity in the technology development venture associated with the respective advance, also comprising operating said host computer to record, for each of said advances, numbers of units subscribed to by the bidding ones of said preselected computers.

5. The method defined in claim 1 wherein said identifications and said respective values are transmitted in encrypted format.

6. The method defined in claim 1 wherein the transmitting of said identifications and the respective values of the determined fixed monetary amounts is undertaken via said host computer.

7. A business method for enhancing investment in new technologies, comprising;
   selecting a predetermined number of potential investors;
   transmitting, to said potential investors, investment opportunities each comprising an identification of purportedly new technology and a fixed monetary amount to be exchanged in return for a predetermined unit of equity in a prospective technology development venture to develop the respective technology;

receiving bids for units of equity from at least some of said investors, the receiving of said bids for units of equity including operating a host computer to monitor messages arriving over a global computer network;

recording identities of the bidding investors and the numbers of units of equity bid;

automatically tallying total units bid;

terminating bidding upon attainment of a predetermined number of units bid, monitoring information arriving over said global computer network at said host computer, said information describing purported advances in technology; and selecting said prospective technology development venture from among the purported advances in technology described in the information arriving over said global computer network.

8. The method defined in claim 7 wherein the transmitting of one of said investment opportunities to said potential investors includes operating said host computer to transmit the respective identification and the respective fixed monetary amount over a global computer network to preselected computers each associated with a respective one of said potential investors.

9. The method defined in claim 8 wherein the automatic tallying of the total units bid includes operating said host computer to add units bid by respective ones of said bidding investors.

10. The method defined in claim 9 wherein the terminating of said bidding includes operating said host computer to transmit a bidding termination signal to the preselected computers associated with said bidding investors.

11. The method defined in claim 8 wherein the automatic tallying of the total units bid includes operating said host computer to add units bid by respective ones of said bidding investors.

12. The method defined in claim 8 wherein the terminating of said bidding includes operating said host computer to transmit over a global computer network a bidding termination signal to computers associated with said bidding investors.

* * * * *